United States Patent [19]

Aladjov

[11] Patent Number: 5,788,943
[45] Date of Patent: Aug. 4, 1998

[54] BATTERY-GRADE NICKEL HYDROXIDE AND METHOD FOR ITS PREPARATION

[75] Inventor: Boyko Aladjov, Cleveland, Ohio

[73] Assignee: The Hall Chemical Company, Wickliffe, Ohio

[21] Appl. No.: 708,655

[22] Filed: Sep. 5, 1996

[51] Int. Cl.$^6$ .................................................. C01G 53/00
[52] U.S. Cl. ................................ 423/594; 429/4; 429/223
[58] Field of Search ........................ 429/223, 4; 423/138, 423/594, 529

[56] References Cited

U.S. PATENT DOCUMENTS

| 3,203,879 | 8/1965 | Mueller | 429/223 X |
| 3,342,640 | 9/1967 | Herold et al. | 429/223 |
| 5,418,090 | 5/1995 | Koksbang et al. | 429/224 |
| 5,496,664 | 3/1996 | Sterr | 429/224 |

*Primary Examiner*—Antony Skapars
*Attorney, Agent, or Firm*—James A. Lucas

[57] ABSTRACT

Nickel hydroxide for use in an electrode of a rechargeable battery is prepared by controlled precipitation from a neutralized reaction mixture of a nickel salt and an alkali metal hydroxide. The controlled precipitation results in the formation of generally spherical particles having a high density. Pulsed or constant ultrasonic energy is applied to the mixture or to a portion thereof during the reaction to cause an alteration in the micro and macrostructures and the surface characteristics of the particles. These alterations result in enhanced performance characteristics of the resultant electrode.

12 Claims, No Drawings

BATTERY-GRADE NICKEL HYDROXIDE AND METHOD FOR ITS PREPARATION

BACKGROUND OF THE INVENTION

1. Field of the Invention

The invention relates to nickel hydroxide and to a method for the production of nickel hydroxide for use in high-energy electrodes for alkaline batteries.

2. Description of Related Art

Considerable effort has been expended in the last few years in the development of rechargeable batteries to meet demands for the powering of portable electronic devices such as laptop computers and wireless telephones and more recently electric vehicles. Among these batteries are nickel-metal hydride, nickel-hydrogen, nickel-zinc, and nickel-iron batteries. These batteries have been developed for the secondary purpose of reducing the use of batteries such as nickel-cadmium and lead-acid batteries which suffer drawbacks resulting from the use of environmentally harmful cadmium and lead.

Nickel hydroxide has been used for many years as an active electrode material for the positive electrode of alkaline batteries. The nickel hydroxide electrodes for these electrochemical cells traditionally fall into one of two major groups, sintered electrodes or pasted electrodes. Sintered electrodes are typically prepared by loading nickel hydroxide into a microporous substrate formed of a perforated steel sheet or mesh followed by sintering to form nickel oxyhydroxide, NiOOH. The more recent pasted electrodes are prepared by producing an aqueous mixture of nickel hydroxide powder in a suitable carrier such as carboxymethyl cellulose. A porous metal substrate of fiber, foam or sponge is then impregnated with the solution to fill the pores of the substrate with nickel hydroxide. One advantage of the pasted nickel electrodes is the higher energy level approaching and even exceeding 600 mAh/cc compared to the typical energy density for sintered electrodes of about 400 mAh/cc.

For use in a battery cell a nickel hydroxide positive electrode ideally possesses the attributes of: 1) high discharge capacity; 2) high charge acceptance; 3) high electrical conductivity; and, 4) long cycle life. Since nickel hydroxide is not the best of conductors by itself, the conductivity of the electrode is commonly improved by the addition of a high conductivity material such as fine nickel, cobalt, their respective oxides, and carbon powders. The highly conductive materials, used separately or together, provide electrical pathways for better charge transfer. This improvement is one involving the macrostructure of the materials, not microstructure and submicrostructures as the other effects described below.

One of the drawbacks related to the use of nickel hydroxide electrodes in alkaline batteries is the tendency of the electrode to swell or expand during charging, particularly during the overcharge portion of the cycle. This swelling is known to reduce the number of charge/discharge cycles that the battery can withstand, i.e., the cycle life, by causing mechanical failures of the battery. Swelling on the macroscopic level is usually explained at the microstructure level by the formation of the lower density, more voluminous γ-phase NiOOH crystallites. The addition of certain metals, such as cadmium, zinc or manganese, as a solid solution with the nickel hydroxide, has been shown to reduce the formation of the γ-NiOOH and thus the swelling. The presence of these other materials is thought to change the interlayer bonding forces of the nickel crystal lattice, thusly suppressing the formation of the γ-NiOOH.

A battery with a high utilization rate demonstrates a high charge/discharge efficiency. Upon charging there are two competing chemical reactions. The desired one is:

$$Ni(OH)_2 + OH^- \rightarrow NiOOH + H_2O + e^- \quad (1)$$

The competing one is:

$$4OH^- \rightarrow 2H_2O + O_2 + 4e^- \quad (2)$$

The oxygen evolution in reaction (2) is not desirable and contributes to lower utilization rates upon charging. One reason both occur is that their electrochemical reaction potential values are very close. Anything that can be done to widen the gap between them, lowering the nickel reaction potential in reaction (1) or raising the oxygen evolution potential in reaction (2) will contribute to higher utilization rates. Additives to the nickel hydroxide, like cadmium and zinc, are intended specifically to raise the oxygen overpotential in reaction (2) while cobalt is thought to affect the $Ni^{+2}$ to $Ni^{+3}$ reversibility and lower the nickel reaction potential in reaction (1).

The charge transfer through the layers of the nickel hydroxide crystal lattice is facilitated if the crystal has a specific disordered structure. A ready measurement of the structure involves the use of x-ray diffraction to determine the degree of crystalinity. The X-ray peaks reflect how well structured the crystal is: the sharper and narrower the peak, the more the degree of crystalinity (orderliness), while the wider the peak, the less the degree of crystalinity (disorderliness). Typically, the sharpness of these peaks are expressed in terms of the half-height width of the 2Θ angle. At least one reference indicates that peak half-height width of 0.8° or more of the (101) plane results in better charge/discharge efficiency.

Surface area is also important to the performance of nickel hydroxide. A higher surface area material results in a lower current density during the charge/discharge cycles and greater charge acceptance. The surface area and the pore size of the particles are influenced by the same manufacturing conditions that are being controlled to generate the desired crystallite structure and, therefore, are not normally controlled.

Nickel hydroxide is typically prepared by the neutralization reaction between an acid nickel salt and an alkali metal hydroxide. The nickel salt is preferably a salt of a mineral acid such as nickel sulfate, nickel nitrate or nickel chloride, whereas the hydroxide is typically sodium hydroxide, lithium hydroxide or potassium hydroxide. The reaction between the nickel salt and the hydroxide results in the precipitation of the nickel hydroxide. The hydroxide is then isolated from the bath by suitable means and is washed and dried.

A variation of the neutralization reaction involves the premix of the nickel salt and ammonia to form a nickel-ammonium complex. The complex, when reacted with the base at specific conditions causes the formation of a dense, spherical-shaped precipitate. The reaction between the nickel, the ammonia, and the base can be carried out simultaneously. Alternatively, the nickel and ammonium ions may be combined prior to contact with the base. The formation of the complex permits greater control over the kinetics of the overall reaction, and over the respective steps of precipitation and crystal growth.

Spherical nickel hydroxide particles are formed from the solution by the simultaneous occurrence of two phenomena: the precipitation of insoluble new seed crystals of nickel hydroxide from solution, and the growth of the crystals. The precipitation and growth can be controlled by regulation of pH feed rates, concentrations, temperature and other process parameters such as vessel configuration and mixing.

During any of these procedures, suitable metal additives such as cobalt, zinc, cadmium or manganese, and transition metal ions such as copper, bismuth, chromium, gallium, indium, lanthanum, samarium or yttrium, as well as other elements including ytterbium, iron, calcium, barium, strontium, mercury or antimony, or other foreign additive materials useful for improving the electrical or physical properties of the nickel hydroxide may be added to the bath and may be co-precipitated with the nickel hydroxide to form a solid solution or be inserted in the crystal lattice at the submicrolevel, or may be added to the nickel hydroxide active material during the production of the positive electrode.

Notwithstanding the progress that has been made in the development of high-energy rechargeable batteries, the need for yet higher performance remains unabated. It is an objective of the present invention to provide an improved method for preparing nickel hydroxide whereby specific properties of the material, for purposes of use in high energy battery applications, are improved.

Another objective of the present invention is to enhance the control of the microstructure and macrostructure properties of nickel hydroxide during production, for use in making positive electrodes for alkaline batteries having both high initial capacity and sustained cycle life, a combination of properties that are normally considered difficult to achieve concurrently.

Another objective is to enable battery manufacturers to make improved electrodes using nickel hydroxide particles having characteristics which promote enhanced electrical performance such as high cycle life or high initial capacity.

Yet another objective is the capability of producing nickel hydroxide material for specific end-use requirements.

These and other objectives are obtained by the teachings of the present invention in the manner to be hereinafter described in greater detail.

SUMMARY OF THE INVENTION

The present invention relates to a process for producing battery-grade nickel hydroxide by reacting an inorganic nickel salt with an alkali metal hydroxide in a liquid medium maintained at a pH and at a temperature at which conversion of the nickel salt to insoluble nickel hydroxide occurs. The process is improved by subjecting the reaction mixture to ultrasonic energy during the formation of the nickel hydroxide to alter the micro and macrostructure and the resulting properties of the nickel hydroxide. The nickel salt is preferably a salt of a mineral acid and is selected from the group consisting of nickel sulfate, nickel nitrate and nickel chloride. The nickel salt is reacted with an alkali metal hydroxide such as sodium hydroxide, potassium hydroxide, or lithium hydroxide.

The invention contemplates, but is not limited to, the reaction of the nickel salt with ammonia or an ammonium compound such as ammonium hydroxide to form a nickel-ammonium-salt complex. The nickel salt complex is then reacted with the alkali metal hydroxide to form the precipitate. This procedure using the ammonium complex typically promotes the formation of nickel hydroxide particles of high density and spherical shape.

The ultrasonic energy is typically applied to the liquid mixture by inserting one or more transducer probes into the liquid, each probe being connected to a suitable ultrasonic generator. The ultrasonic energy is applied to the liquid medium continuously or intermittently. Intermittent operation of the ultrasonic generator may involve an 'on' phase for a given duration of time followed by an 'off' phase for a similar or a different duration. The ratio of the duration of the 'on' phase to the 'off' phase depends on interrelated factors in the reaction process such as composition and stability of the ammonia complex, the vessel volume and geometry, and bulk mixing conditions as well as the amount of power and frequency generated by the ultrasonic generator. A ratio of the 'on' to 'off' phases of between 1:10 and 10:1 is typical. In a preferred embodiment, the ultrasonic energy is passed through the liquid medium for a controlled period of time, after which the energy is discontinued for a slightly longer period of time. The energy level of each 'on' phase may be equal to one another. Alternatively, the energy levels from one cycle to another may be varied. Furthermore, the energy level during each 'on' pulse may be constant or variable.

In another embodiment of the invention, a battery-grade nickel hydroxide having a density of about 2.0 g/cc and a surface area of at least about 8 $m^2/g$ is used in a battery having a sustained capacity over a plurality of operating cycles. The nickel hydroxide is composed of generally spherical particles prepared by precipitation of nickel hydroxide from a reaction mixture in which a nickel salt, either a sulfate, nitrate, chloride, or an ammonium complex of a nickel salt is reacted with an alkali metal hydroxide in a neutralization reaction whereby nucleation of the nickel hydroxide particles followed by growth of the particles occurs. Although both the nucleation and growth occur simultaneously, the amount of nucleation in relation to growth is increased while the ultrasonic energy is being applied to the reaction mixture. Conversely, particle growth is increased in relation to nucleation during a period when no ultrasonic energy is applied to the reactants.

As an alternative to conducting the entire reaction in one vessel with 'on'–'off' cycling of the ultrasonic energy, the reaction mixture may be subjected to ultrasonic energy in a first reaction vessel after which the mixture or some portion of it is transferred to another vessel for further processing. The formation of seeds having a more disordered crystal structure is promoted in the first vessel, using ultrasonic energy. The seeds are then transferred to another environment in which growth of the nickel hydroxide is promoted at a reduced level of ultrasonic energy or in the total absence of such energy. The seeds may be transferred while in the liquid medium. Alternatively, they may be separated from the liquid medium by suitable means such as decantation or filtration, and transferred into a second liquid medium where they are resuspended. The second liquid medium typically contains the same mixture of nickel salt and an alkali metal hydroxide as in the first vessel. Optimum conditions of concentrations, pH and temperatures can be determined to enhance seeding in the first vessel. A second set of reaction conditions typically is used to promote particle growth in the second vessel.

In yet another embodiment of the present invention, nickel hydroxide may be prepared by continuously or intermittently withdrawing a portion of the reaction mixture of the nickel salt (or nickel ammonium complex) and the alkali metal hydroxide from a main reaction vessel, subjecting the withdrawn portion to ultrasonic energy and returning the portion to the main vessel. The withdrawn portion may be treated in a batch process in a secondary vessel having one or more ultrasonic probes immersed in the mixture or attached to the body of the vessel. Alternatively, the withdrawn portion may be passed through a chamber coupled to the ultrasonic generator operating in a substantially continuous manner to produce the seed crystals. This portion is then returned to the first reaction vessel where the seed crystals undergo further growth.

DETAILED DESCRIPTION OF THE INVENTION

The present invention describes an improved method of preparing nickel hydroxide useful in the manufacture of electrodes for alkaline batteries. The method involves the formation of nickel hydroxide by reacting in solution a nickel salt with an alkali metal hydroxide under conditions wherein the nickel hydroxide is insoluble and forms a precipitate.

The teachings of the present invention can be used to produce a variety of nickel hydroxide products having microstructure and macrostructure characteristics custom tailored to defined end-use requirements. Alteration of the properties by conventional techniques such as pH adjustment, temperature control, concentration, flow rates and agitation, are well known. However, the teachings of the present invention make it possible to produce a nickel hydroxide with a combination of micro and macrostructure that can not necessarily by achieved by conventional production means. With the teachings of the present invention, another tool is now available for changing the properties of the nickel hydroxide on the micro and macrostructure levels.

Examples of microstructural properties are crystal lattice, crystal size and shape, as determined by x-ray diffraction data. Examples of macrostructural properties include pore size, shape and distribution, surface area and particle size and distribution.

According to the present invention, the application of ultrasonic energy to the reaction mixture results in a change in the shape, number and size of the small seed crystals in the reactor, and alters their crystallite structures enhancing the imperfect and disordered nature, resulting in better performing material. Typically, when ultrasonic energy is applied for a given set of operating conditions and especially pH the seed crystal size is smaller, with a greater number of crystals being formed. Conversely, during the portion of the cycle when ultrasonic energy is not applied, the larger seed crystals are formed having a more ordered crystal structure, thereby generating particle shaving a higher density. By controlling the ratio and amount of ultrasonic energy, particles of both types can be produced in a wide range of proportions. Although the use of ultrasonic energy is associated with the formation of seed crystals and the absence of ultrasonic energy is associated with the growth of the crystals, both steps occur simultaneously, but at differing rates relative to the precipitation conditions as well as the amount of ultrasonic energy applied.

In a specific application of the foregoing, it is known that a positive electrode having constant charge/discharge capacity over an extended number of cycles can be produced from dense nickel hydroxide particles having a relatively high surface area and low tap density. A similar electrode with higher initial capacity can be obtained by using a denser nickel hydroxide particle having a lower surface area. However, the initial capacity of the second electrode drops off more quickly during cycling than does the capacity of the first electrode using the less denser material. Per the present invention, a denser-type particle can be produced with the surface area of the particles increased by using ultrasonic energy.

Ultrasonic generators are devices which are well-known and do not require detailed discussion. Basically, the device consists of an ultrasonic generator containing an oscillator driving an electroacoustic transducer which converts electrical energy to mechanical energy to produce waves having a frequency above 20 kHz (20,000 cycles/second). The ultrasonic energy added to the system is transmitted to the fluid medium through a transducer probe placed directly into the medium, or by one located on the outside walls of the vessel. The transducer probe creates pressure waves within the liquid and the action of the pressure waves forms microscopic bubbles which expand and implode in a phenomenon called cavitation. This cavitation produces shearing action causing intense agitation of the liquid. In place of a single probe, multiple, spaced apart transducer probes can be used to create a plurality of focal points for intense agitation of the liquid. A transducer probe can be used to cause cavitation in the bulk reaction vessel or in a separate mixing vessel or line where fluid is circulated from the main vessel. The probes can be driven by one generator or by separate power sources. The ultrasonic generator can be equipped with sophisticated controls to regulate the amplitude (energy) as well as the 'on' time and 'off' time of the transducer. Commercial ultrasonic units having fixed or variable outputs from a few watts to several megawatts are available and are suitable for use in the teachings of the present invention.

Although not intending to be bound by any particular theory, the addition of ultrasonic energy to the bath during the reaction of the nickel salt or the nickel ammonium complex is thought to 1) alter the crystal microstructure during nucleation or crystal formation thereby increasing the number of defects within the crystal; 2) alter the particle macrostructure during the growth phase to increase the surface area; and, 3) increase the number of nuclei produced at a given set of operating conditions in the reactor. An increase in the structural defects of the nickel hydroxide crystal is known to increase the ability of the electrode to accept and store a charge over a large number of operating cycles and temperatures. Forcing faster nucleation results in more particles with the desired degree of structural defects. The higher surface area results in a lower effective current density of operation for the battery.

The use of ultrasonic energy is thought to alter the macrostructure of the nickel hydroxide, affecting the physical parameters such as surface area, the pore size, pore shape, pore volume and pore distribution within the particles. The highly developed pattern of shallow irregularities on the particle surface rather than deep fissures which characterize prior art particles of nickel hydroxide is thought to improve performance. In addition to lowering the current density, the high surface area enhances contact between the electrolyte and the particle, while the absence of deep fissures is believed to preclude undesirable penetration of the battery electrolyte into the particle interior.

The addition of foreign materials such as cadmium, cobalt, or zinc to the nickel hydroxide by co-precipitation appears to have no effect on the beneficial teachings of the present invention. In other words, the advantages of adding these metals to increase conductivity or electric capacity of nickel hydroxide, or to reduce the swelling caused by the formation of $\gamma$ NiOOH can still be obtained while ultrasonically producing a dense particle having increased surface area and improved battery performance.

As previously mentioned, the process can be carried out with the ultrasonic energy being applied in a steady state condition. On the other hand, the results appear to be more desirable if the ultrasonic generator is cycled 'on' and 'off' on a repeating cycle. Typically, a time ratio of about 1 to 10 units of time for the 'on' cycle versus 10 to 1 unit of time for the 'off' cycle gives favorable results. The actual values are, however, highly dependent on the ratio of the power supplied via the ultrasonic generator and the volume of the vessel as well as the specific chemical equilibrium conditions established. It is evident, though, that the parameters such as the ratio between the 'on' and 'off' cycles, as well as the amplitude of the energy being applied to the bath, can be varied without departing from the present invention. Furthermore, the 'off' phase of the cycle can be replaced in whole or in part by a reduced energy cycle wherein the power output is substantially less than the power during the 'on' phase.

The amount of specific ultrasonic power to be applied to the nickel hydroxide reactants typically is in the range of between about 1 to about 1000 watts per liter. The values are not limited to these figures and the preferred range depends upon such factors as the type and rate of reaction, the properties of the reactants, the pH and temperature ranges as well as the reaction configuration agitation rate and the residence of the materials in the reactor. In addition, the length of the on/off cycle and the ratio of each pulse of the cycle are factored into the amount of power that is needed.

The following examples are presented for the purpose of further illustrating but not limiting the invention.

EXAMPLE 1

An ammonium complex of nickel sulfate is prepared by reacting nickel sulfate with ammonium hydroxide in an aqueous solution at a temperature of 40°–60° C. with slow mechanical agitation. The volume of the solution is approximately 15 liters.

A standard stainless steel probe connected to a model VCX600 ultrasonic processor sold by Sonics & Materials Inc., of Danbury, Conn., is immersed in the solution of the nickel-ammonium complex. To the solution is slowly added with agitation NaOH at a concentration of 30% to 50% by weight. During the course of the reaction, the solution is subjected to ultrasonic energy sufficient in duration and intensity to alter the morphology of the particles as they are formed. The reaction is typically conducted in an aqueous solution maintained at a temperature between about 20° C. and 80° C., and a pH between about 9 and 14, preferably between about 11 and 13. The reaction can be carried out in a batch or continuous process. Suitable means such as mechanical agitation is used to ensure intimate contact between the reactants. The ultrasonic processor, operating at maximum power of 600 watts, is programmed to cycle 'on' for a pulse of 0.1 second and then 'off' for 0.5 second. The applied energy level is equivalent to 40 watts per liter.

As the insoluble nickel hydroxide is formed, it precipitates out of solution. It is separated from the solution by decantation and filtering and is then dried. A control sample of nickel hydroxide is prepared following the same procedures excluding the ultrasonic treatment. By maintaining proper stoichiometric relationships between the reactants, high conversion rates are achieved in both procedures.

The two samples are examined and found to be comprised of generally spherical particles. The particles are analyzed to determine tap density, average particle size and surface area. The results are shown in Table 1.

Battery tests to measure specific discharge capacity of the two samples of nickel hydroxide are performed in the following manner.

A paste is prepared by mixing on a weight basis 85% nickel hydroxide, 14% cobalt oxide, 0.5% polytetrafluoroethylene emulsion and 0.5% carboxymethylcellulose binder previously dissolved in water. The paste is applied to a highly porous nickel foam coupon in several layers to form a pasted electrode which is lightly pressed, rolled and dried.

The electrode formation step consists of an initial charge at C/4 up to 150% overcharge calculated on a 0.289 Ah/g theoretical capacity, a discharge at C/4 to a cut-off voltage 0.8 V and another C/4 charge up to 150% overcharge. Finally, the electrodes are washed, the electrolyte is replaced with fresh solution and the cycling procedure is started. The electrodes are cycled at C/4 to 150% overcharge and a 0.8 V cut-off voltage on discharge. The comparative results appear in the last column of the table.

TABLE 1

| Sample | Tap Density (g/cc) | Particle Size (μ) | BET Surface Area (m²/g) | Relative Specific Discharge Capacity @ 5th Cycle (%) |
|---|---|---|---|---|
| Without Ultrasonics | 2.03 | 11.98 | 14.17 | 100 |
| With Ultrasonics | 2.02 | 12.03 | 21.12 | 118 |

Thus, it can be seen that the use of ultrasonic energy results in a particle having about 50% greater surface area with no decrease in tap density.

The table clearly shows that for a given cycle life at constant charge/discharge conditions for both samples, the discharge capacity of the battery utilizing nickel hydroxide prepared with the aid of ultrasonic energy is about 18% greater than that of the battery using nickel hydroxide prepared according to the prior art.

EXAMPLE 2

A nickel-ammonium complex is prepared according to the procedure outlined in Example 1. Sodium hydroxide at a concentration of 30–50% by weight is slowly added to the solution with agitation. A portion of the solution is withdrawn and is transferred to a 1.0 liter reaction vessel where it is subjected continuously to 400 watts/liter of ultrasonic energy to enhance the formation of disordered seed crystals. The withdrawn portion is then returned to the main reaction vessel where crystal growth is promoted in the absence of ultrasonic energy. Highly uniform, dense, spherical particles of nickel hydroxide are formed. Table 2 shows that for similar tap densities, the surface area of the ultrasonically enhanced particles is about 38% greater and the specific discharge capacity is 15% greater than for the untreated particles.

TABLE 2

| Sample | Tap Density (g/cc) | Particle Size (μ) | BET Surface Area (m²/g) | Relative Specific Discharge Capacity @ 5th Cycle (%) |
|---|---|---|---|---|
| Without Ultrasonics | 2.04 | 12.14 | 12.74 | 100 |
| With Ultrasonics | 2.03 | 12.39 | 17.55 | 115 |

EXAMPLE 3

A first reaction vessel of 1.0 liters is used to prepare seed crystals of nickel hydroxide from an ammonium complex of nickel sulfate to which sodium hydroxide is slowly added. An ultrasonic generator is immersed in the solution which is subjected to 400 watts/of energy per liter while sodium hydroxide is slowly added to the complex while stirring.

A second reactor vessel of 15 liters contains an ammonium-nickel complex and is provided with a mechanical agitator. As seed crystals are formed in the first reactor vessel, a portion of the mixture containing the crystals is transferred to the second vessel concurrently with the addition of sodium hydroxide accompanied by thorough mixing. In the absence of ultrasonic energy in the second vessel, the growth of dense spherical particles of nickel hydroxide is promoted. Table 3 shows that the ultrasonically treated particles exhibit a surface area 38% higher and a specific capacity 14% higher than the other particles.

TABLE 3

| Sample | Tap Density (g/cc) | Particle Size (μ) | BET Surface Area (m²/g) | Relative Specific Discharge Capacity @ 5th Cycle (%) |
|---|---|---|---|---|
| Without Ultrasonics | 2.03 | 11.42 | 14.31 | 100 |
| With Ultrasonics | 2.03 | 12.63 | 19.62 | 114 |

Although the invention has been described in specific as well as in general terms, the description is exemplary only and is not intended to be construed as a limitation thereof. Instead, the grant of protection is to be defined according to the scope of the claims including their reasonable equivalents as construed in light of this description.

What is claimed is:

1. A process for producing battery-grade nickel hydroxide by forming a reaction mixture of inorganic nickel salt with an alkali metal hydroxide in a liquid medium maintained at a pH and at a temperature at which conversion of the nickel salt to an insoluble nickel hydroxide precipitate occurs, the improvement comprising introducing ultrasonic energy into at least a portion of the reaction mixture during the formation of the nickel hydroxide precipitate to alter the macro and microstructure of the nickel hydroxide.

2. The process according to claim 1 wherein the nickel salt is selected from the group consisting essentially of nickel sulfate, nickel nitrate and nickel chloride.

3. The process according to claim 2 wherein the nickel salt is reacted with a compound selected from the group consisting of an inorganic ammonium compound and ammonia to form a nickel-ammonium-salt complex following which the complex is reacted with the alkali metal hydroxide to form a precipitate of insoluble spherical particles.

4. The process according to claim 1 wherein the reaction mixture is subjected to ultrasonic energy cycled through at least one on-off cycle.

5. The process according to claim 4 wherein the ratio of the duration of the 'on' phase of the cycle to the duration of the 'off' phase is between about 1:10 and 10:1.

6. The process according to claim 5 wherein the reaction mixture is subjected to repeated on-off cycles in which each 'on' phase and each 'off' phase are approximately equal in duration.

7. The process according to claim 5 wherein the reaction mixture is subjected to repeated cycles and the energy level of each 'on' phase is the same.

8. The process according to claim 1 wherein a portion of the reaction mixture is withdrawn from the liquid medium, is subjected to ultrasonic energy, and thereafter is returned to the liquid medium.

9. The process according to claim 8 wherein the portion of the reaction mixture is withdrawn, subjected to ultrasonic energy and returned on a substantially continuous basis.

10. The process according to claim 8 wherein the portion of the reaction mixture is withdrawn, subjected to ultrasonic energy and returned to the liquid medium in a batch process.

11. The process according to claim 1 wherein a first portion of the reaction mixture is subjected to ultrasonic energy and is thereafter mixed with a second portion of the reaction mixture which has been subjected to a reduced level of ultrasonic energy.

12. The process according to claim 11 wherein the level of ultrasonic energy applied to the second portion of the reaction mixture is zero.

* * * * *